United States Patent [19]

Bergendahl

[11] 4,123,971

[45] Nov. 7, 1978

[54] ROLLER PRESS FOR THERMAL COMPACTION AND THERMAL BRIQUETTING OF LOOSE MATERIALS

[75] Inventor: Hans-Georg Bergendahl, Bochum-Weitmar, Fed. Rep. of Germany

[73] Assignee: Maschinefabrik Köppern GmbH & Co KG, Hattingen, Fed. Rep. of Germany

[21] Appl. No.: 713,060

[22] Filed: Aug. 9, 1976

[30] Foreign Application Priority Data

Aug. 18, 1975 [DE] Fed. Rep. of Germany ....... 2536670

[51] Int. Cl.$^{2}$ ........................ B02C 11/08; B30B 15/34; B29C 3/02

[52] U.S. Cl. ................................ 100/93 RP; 425/237

[58] Field of Search .................... 100/93 RP, DIG. 6; 165/86-90; 425/237

[56] References Cited

U.S. PATENT DOCUMENTS

| | | | |
|---|---|---|---|
| 2,936,158 | 5/1960 | Ramundo | 100/93 RP |
| 3,248,803 | 5/1966 | Krikdrian | 165/90 X |
| 3,907,486 | 9/1975 | Kennedy | 425/237 X |

FOREIGN PATENT DOCUMENTS

| | | | |
|---|---|---|---|
| 213,035 | 8/1955 | Australia | 425/237 |
| 814,970 | 6/1959 | United Kingdom | 425/237 |

*Primary Examiner*—Harvey C. Hornsby
*Assistant Examiner*—John M. Jillions
*Attorney, Agent, or Firm*—Salter & Michaelson

[57] ABSTRACT

A roller press, for the thermal compaction and briquetting of loose material, having rollers each comprising a core having a cylindrical outer surface and a shell carried on the core, the shell being formed from a plurality of adjacent segments each extending longitudinally of the roller and having longitudinal edges parallel to the axis of the roller and detachably secured at their ends to the roller core, circumferentially-spaced cooling ducts parallel to the axis of rotation of the roller being provided in the roller core at positions inwardly of the outer surface of the core and interconnected to form at least one cooling circuit provided with an inlet and an outlet for the passage therethrough of a coolant. The cooling ducts in the roller core can be connected in series or in parallel.

5 Claims, 3 Drawing Figures

ROLLER PRESS FOR THERMAL COMPACTION AND THERMAL BRIQUETTING OF LOOSE MATERIALS

Figure 1:
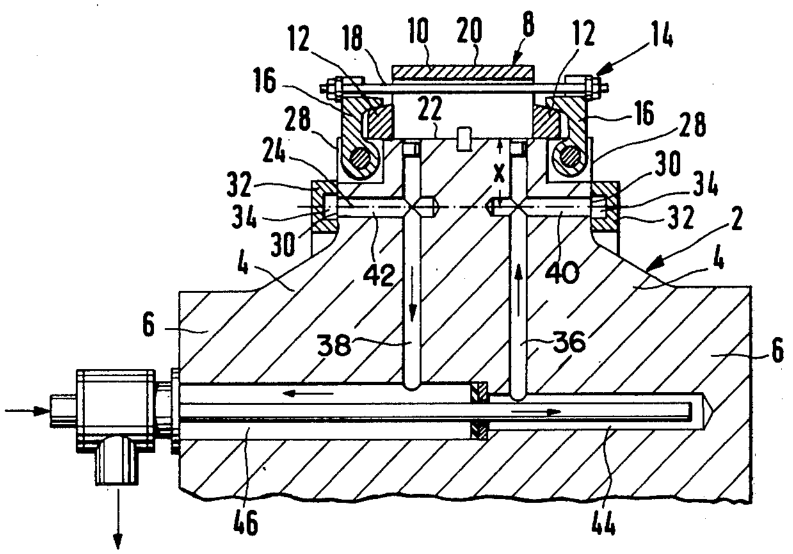

The invention relates to a roller press for thermal compaction and thermal briquetting of loose materials, in which each of the rollers comprises a core having a cylindrical outer surface and a shell carried on the core, the shell being formed from a plurality of adjacent segments each extending longitudinally of the roller and having longitudinal edges parallel to the axis of the roller and detachably secured at their ends to the roller core.

In the case of thermal compaction and briquetting of pre-reduced iron ores or spongy iron especially, the loose material has to be treated at temperatures above 900° C. At these high temperatures, the segments suffer considerable wear, especially where moulding depressions for the production of shaped briquettes are provided in them. In order to provide an adequate service life for the segments, segments are used that are made of materials that are usually very resistant to wear and very hard. The hardness may, for example, reach 60 HRc. However with increasing hardness of the materials, their toughness decreases and the brittleness increases and thus the risk of tearing and fracture of the material arises. In spite of this the service lives of the segments remain comparatively short.

An object of the invention is to provide means whereby it is possible to realise substantially longer service lives for the segments.

This problem is solved according to the invention in that circumferentially-spaced cooling ducts parallel to the axis of rotation of the roller are provided for the segments at positions inwardly of the outer surface of the core, the ducts being connected to form at least one coolant circuit provided with an inlet and an outlet for the passage therethrough of a coolant, one or each pair of inlets and outlets communicating with common inlet and outlet connections co-axial with the roller core.

In a preferred embodiment annular plate may be provided on end faces of the roller core, each annular plate containing circumferentially-extending internal ducts communicating with the internal cooling ducts in the roller core, thereby to interconnect cooling ducts in the roller core to produce at least one said cooling circuit therein.

Alternatively, flow paths interconnecting internal cooling ducts in the roller core may be formed in one or each end face of the roller core, said end face or end faces carrying annular cover plates secured over said flow paths.

Two or more of said internal cooling ducts may be connected in series or in parallel to form one or more of said coolant circuits.

The invention also provides a roller for use in a roller press as set out in any one of the preceding four paragraphs.

With a roller press designed according to the invention, the segment temperature during operation can be considerably reduced, whereby in turn the wear is reduced. By the cooling, a constant temperature gradient is set up over the radial thickness of the segment, which thereby owing to the cooling, is subjected to only slight internal stresses. Further in the roller press according to the invention, the heat flow to the shaft of the roller core and therefore to the bearings of the roller core is substantially reduced.

It is known to cool the surface of the press rollers during thermal briquetting by currents of air or by spraying with water or wet steam. This type of cooling leads to considerable thermal stresses and therefore to increased risk of cracking especially with brittle materials (British Pat. No. 295,910).

In rollers for roller presses for briquetting coal having a shaping ring into the outer surface of which the briquette moulds are inserted, it is known to cool or heat the shaping rings and therewith the moulding depressions. For this purpose it is known to provide outward-opening ducts in the surface of the roller core, the said ducts being provided with inlet or outlet ducts for a cooling or heating medium, led through the roller shaft. Here the ducts are hermetically sealed at their outer ends by the shaping ring which is shrunk on to the roller core (German patent application No. 1,029,723 and German Pat. No. 809,546). It is also known, in a cylinder press for producing ice briquettes, to provide a duct for liquid opening inwards, in a shaping ring, the duct here being closed by the cylindrical surface of the roller core (German Pat. No. 601,426).

Figure 2A:
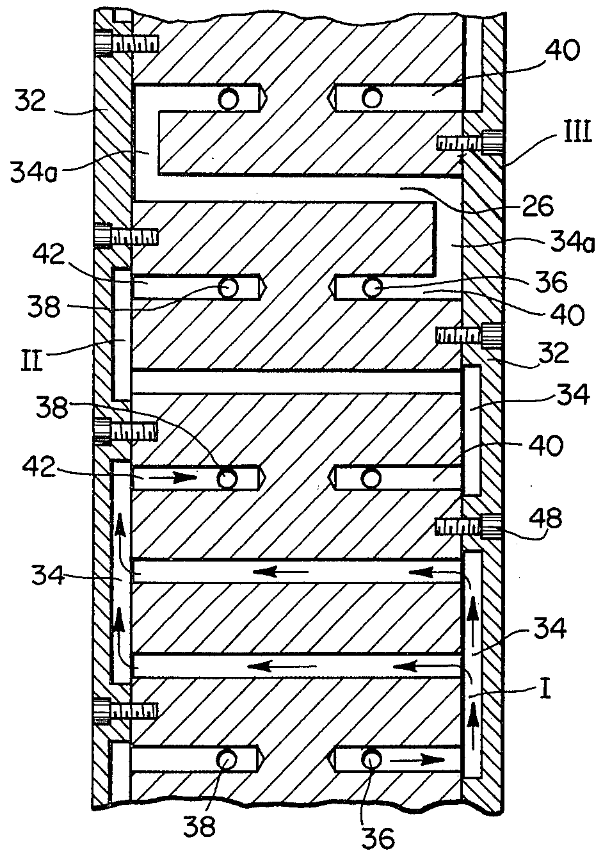

An embodiment in accordance with the invention is illustrated by way of example with reference to the accompanying drawings in which:

FIG. 1 shows a longitudinal section through approximately half of a press roller designed according to the invention for use in a roller press to be used for the thermal briquetting of iron ores, and FIG. 2*a* shows a plan development of the press roller shown in FIG. 1 wherein the cooling ducts thereof are arranged in parallel.

Figure 2B:
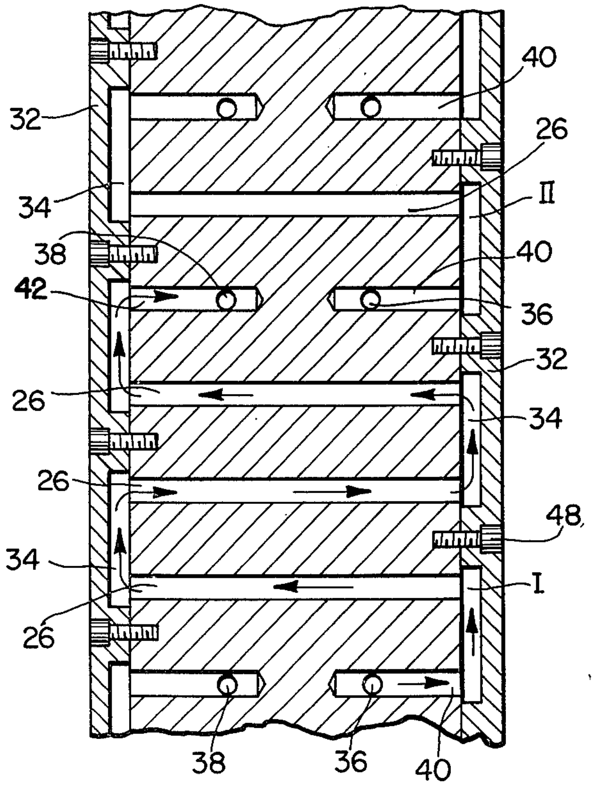

FIG. 2*b* is a view similar to FIG. 2*a* but showing the cooling ducts connected in series.

FIG. 1 shows a longitudinal section through approximately half of a press roller 2 designed according to the invention. Two such press rollers arranged with their axes of rotation parallel are disposed side-by-side in a substantially horizontal plane in a roller press. The press roller 2 has a generally cylindrical core 4 which is made in one piece with axial extensions 6 by which the roller can be rotated over ball bearings in bearing blocks which are situated in lateral openings of the press housing. Normally the axis of rotation of one of the press rollers is fixed while the other press roller is movable horizontally relative to the fixed roller, usually against a hydraulic support.

The press roller core 4 is provided on its circumference with a shell 8 which consists of a plurality of longitudinal segments 10 having longitudinal edges parallel to the axis of the roller and adjacent one another at the circumference of the roller core. The segments 10 are provided at their ends with extensions 12 which are engaged by fastenings 14 by which the segments are fixed to the roller core 4. The fastenings 14 shown in the drawing are hinged clamp straps 16 mounted on the roller core 4 and are pressed against the segments 10 through tension bolts 18 of which only one is shown. Alternative fasteners can be provided, for example cooled shrunk rings, radially disposed bolts, or equivalent means.

The external surfaces 20 of the segments 10 can be plain cylindrical surfaces. However moulding depressions can alternatively be provided in known manner in the segment surfaces. The roller core 4 is provided with a smooth cylindrical surface 22 at its circumference.

The radially inner supporting surfaces of the segments 10 are correspondingly of smooth part-cylindrical shape.

At a distance *x* from the surface 22 of the roller core 4 cooling ducts 26 each parallel with the axis of the roller 2 are provided on a pitch circle indicated at 24. As can be seen from FIGS. 2*a* and 2*b*, these ducts extend between the end faces 28 of the roller core 4. In front of the outlets 30 of the cooling ducts 26, annular plates or rings 32 are fixed on the end faces 28 of the roller core 4. The rings 32 have circumferentially-extending ducts 34 formed thereon. The ducts 34, as can be seen from FIGS. 2*a* and 2*b*, can be designed in such a way that they respectively form a flow path between the ends of two neighbouring cooling ducts 26. In this way a meandering duct having an inlet 36 and an outlet 38 for the cooling medium, especially water, is formed. The inlets 36 and the outlets 38 may be connected to duct sections 40, 42 parallel to the other cooling ducts 26 and extending to a limited extent into the core 4. However it is also possible to provide a through drilling and to separate the latter into two sections by a plug in the middle. From the respective duct sections 40 and 42, the inlet and outlet 36, 38 are preferably formed by radial drillings leading to axial ducts 44 and 46, which are led through one or both of the shaft extensions and are connected to attachments for introducing and removing the coolant. The drillings are closed by plugs at the circumference 22 of the roller core.

In order to achieve a uniform cooling effect, a plurality of cooling circuits can be provided, distributed over the circumference of the pitch circle. In FIGS. 2 and 2*a* three such cooling circuits I, II and III are shown, each being connected by respective radial drillings 36 and 38 with the inlet and outlet 44 and 46 in the shaft.

In the embodiment in FIGS. 2 and 2*a*, the coolant circuit I is connected in parallel and consists of a plurality of cooling ducts 26 one behind the other. It is also possible to connect all of the cooling ducts 26 in parallel. In this case the ring would have to be provided with a circular groove open towards the end face of the roller core 4; for uniform loading of the cooling ducts it is expedient to provide a plurality of radial inlet and outlet drillings here too. In the embodiment shown in FIG. 2*b*, the cooling circuit I is connected in series.

It is also possible to provide a plurality of coolant circuits with cooling ducts passed through in parallel in each case. In such an embodiment shown as the cooling circuit I in FIG. 2*a* , the flow channel 34 inside the ring 32 would have to be divided over the circumference into a corresponding number of sections, each section then being connected to a plurality of cooling ducts 26. It is further possible to provide a plurality of cooling circuits with cooling ducts passed through in series in each circuit, as shown in cooling circuit I in FIG. 2*b*.

In any case, the connecting of the cooling ducts 26 is chosen from the point of view of producing a heat sink which operates as uniformly as possible over the whole circumference 22 of the roller core 4.

The flow paths interconnecting the flow ducts 26 can also be inserted into the two end faces of the roller core 4; a ring smooth on the inside can be used as a seal for covering the said flow paths.

The rings 32 are respectively secured by bolts to the roller core. For flow circuits such as those represented in FIG. 2, the bolts indicated at 48 can be screwed into the roller core 4, on the pitch circle 24, through massive lands between neighbouring flow paths 34. Also as shown by reference numeral 34*a*, the flow path may be directly formed in the end face of the roller core.

Finally it is possible to connect two adjacent cooling ducts 26 via external flow paths to an annular duct, there being connected a first radial drilling for the admission of the cooling medium and a second radial drilling for the discharge of the cooling medium. The flow paths between these two radial drillings should preferably be of equal length and in that case, the annular flow path thus formed is traversed by two opposing streams from the inlet to the outlet drilling.

What I claim as my invention and desire to secure by Letters Patent of the United States is:

1. A roller press, for the thermal compaction and briquetting of loose material, having rollers, each said roller comprising a core having a cylindrical outer surface and a shell carried on the core, the shell comprising a plurality of adjacent segments each extending longitudinally of the roller and having longitudinal edges parallel to the axis of the roller and means to detachably secure the ends of said segments to said roller core, said roller core having therein circumferentially-spaced cooling ducts parallel to the axis of rotation of said roller at positions inwardly of the outer surface of sad roller core, said cooling ducts being sealed from communication with said segments, means interconnecting said cooling ducts to form at least one cooling circuit, means defining an inlet and an outlet for the passage through each said coolant circuit of a coolant, and means defining common inlet and outlet connections co-axial with said roller core and respectively communicating with said inlet and outlet means of each said coolant circuit, a plurality of annular plates being provided on end faces of said roller core, said means interconnecting said cooling ducts in part including an internal duct circumferentially extending within said annular plate, said internal duct communicating with at least two adjacently disposed said cooling ducts in the roller core to produce said at least one cooling circuit therein, said segments being removable from said core without disconnecting said at least one cooling circuit.

2. A roller press as claimed in claim 1 in which said internal duct is formed in at least one end face of said roller core.

3. A roller press as claimed in claim 1 in which at least two of said cooling ducts in said roller core are connected in a series to form said at least one coolant circuit.

4. A roller press as claimed in claim 1 in which at least two of said cooling ducts in said roller core are connected in parallel to form said at least one coolant circuit.

5. A roller press for use in the thermal compaction and briquetting of loose material and having at least one roller, said roller including a core having a cylindrical outer surface on which a shell is mounted, said shell including a plurality of outer segments arranged in adjacent relation, said segments extending longitudinally of said roller and having longitudinal edges extending parallel to the axis of said roller and means for detachably securing the ends of said segments to said roller core, said roller core having cooling ducts formed therein that are spaced from the axis of said core and that are located parallel thereto, said ducts being spaced inwardly of the outer surface of said roller core and sealed from communication therewith, radial passages formed in said core and communicating with said ducts to define coolant circuits therewith, concentric inlet and outlet passages located coaxially in said core and communicating with said radial passages respectively to inlet and outlet means for said coolant circuits, and a plurality of annular plates located on the end faces of said roller core and having a circumferentially extending internal duct located therein communicating with said cooling ducts in the roller core, said internal ducts in said plates being sealed from said segments so that said segments are removable from said core without disconnecting the coolant circuits.

* * * * *